United States Patent [19]

Bishop

[11] Patent Number: 5,322,308
[45] Date of Patent: Jun. 21, 1994

[54] FOUR WHEEL STEERING SYSTEMS

[75] Inventor: Arthur E. Bishop, Gladesville, Australia

[73] Assignee: A. E. Bishop & Associates Pty. Limited, Gladesville, Australia

[21] Appl. No.: 849,369

[22] PCT Filed: Nov. 2, 1990

[86] PCT No.: PCT/AU90/00529

§ 371 Date: May 14, 1992

§ 102(e) Date: May 14, 1992

[87] PCT Pub. No.: WO91/06463

PCT Pub. Date: May 16, 1991

[30] Foreign Application Priority Data

Nov. 3, 1989 [AU] Australia .............................. PJ 7201

[51] Int. Cl.[5] ............................................... B62D 5/06
[52] U.S. Cl. ......................................... 280/91; 180/140
[58] Field of Search ..................... 280/91, 99; 180/140

[56] References Cited

U.S. PATENT DOCUMENTS

| 4,719,981 | 1/1988 | Miyoshi | 180/140 |
|---|---|---|---|
| 4,770,264 | 9/1988 | Wright et al. | 180/140 |
| 4,874,183 | 10/1989 | Chikuma et al. | 280/91 |
| 4,878,556 | 11/1989 | Wells | 180/140 |

FOREIGN PATENT DOCUMENTS

| 0289039 | 11/1988 | European Pat. Off. |
|---|---|---|
| 3820967 | 1/1989 | Fed. Rep. of Germany |
| 2188600 | 10/1987 | United Kingdom |
| 2222990 | 3/1990 | United Kingdom |
| 9106463 | 5/1991 | World Int. Prop. O. ............ 280/91 |

OTHER PUBLICATIONS

Car Australia, *Bum Steer*, February.
*The Mazda Speed Sensing Computerised 4-Wheel Steering System.*
SAE-A Journal, 4 *WS on track for handling*, Jul./Aug. 1989.

*Primary Examiner*—Eric Culbreth
*Attorney, Agent, or Firm*—Nikaido, Marmelstein, Murray & Oram

[57] ABSTRACT

A front and rear wheel steering system for a vehicle has a front steer system (23, 25) and a rear steer system (21, 22) with a rear steer controller (12) functioning to set the rear steer angle in dependence upon front steer angle and vehicle speed. A low load capacity feedback device (14) functions to maintain a predetermined relationship between front and rear wheel steer angles with an overload protector (74, 77, 78) protecting the feedback device (14) from damage due to the application of loads above a predetermined level.

18 Claims, 11 Drawing Sheets

FOUR WHEEL STEERING SYSTEMS

BACKGROUND OF THE INVENTION

1. Field of Invention

The present invention relates to four wheel steering systems for vehicles and more particularly front and rear wheel steering controlled by steering input from a driver operating a steering wheel. Typically, such systems provide that the rear wheels turn in the same direction as the front wheels in modes of operation associated with high vehicle speeds and in opposite directions in modes of operation associated with low vehicle speeds and intermediate degrees of turn of the rear wheels at speeds intermediate between such high and low speeds.

2. Description of Prior Art

The prior art in this area includes U.S. Patent specifications No. 3,596,730 (Cecce); 4,313,514 (Honda); 4,467,885 (Honda); 4,483,547 (Honda); 4,660,844 (Honda); 4,572,316 (Mazda); 4,646,867 (Mazda); 4,730,839 (Mazda); 4,733,878 (Mazda); 4,781,261 (Toyota); 4,770,264 (Lotus). As exemplified by these patents, innovation in the area of four wheel steering has been extremely diverse in terms of the technical solution to the problem. Surprisingly, as yet, this has not resulted in widespread adoption of such steering systems in the market-place notwithstanding that test reports indicated that vehicles incorporating four wheel steering provide several advantages including improved safety in high speed driving Two presently marketed systems are broadly covered by Honda U.S. Pat. Nos. 4,313,514 and 4,467,885 and Mazda U.S. Pat. Nos. 4,572,316 and 4,730,839 and have been described extensively in the technical literature. Information concerning the current commercial system adopted by Mazda in their MX-6 vehicle can be found in Car Australia magazine of February 1989 at page 52 et seq and a Technical Information document published by Mazda Australia Pty Limited entitled: "The Mazda Speed Sensing Computerised 4-Wheel Steering System". The present invention will be described primarily with respect to these two examples of the prior art. In the Honda system, the rear steering is entirely mechanically driven and not directly speed dependent, whereas the Mazda system is speed dependent and therefore more relevant to the present invention.

The reluctance in the market broadly adopting four wheel steering systems may reside in that they are costly, add considerable weight to the vehicle, and have serious functional shortcomings. Also, it may be that those systems enforce compromises in the design of associated front and rear suspensions which result in less desirable suspension performance. In many cases their performance depends upon electronic signals between front and rear steering gears which, in the event of a malfunction, may cause serious vehicle control problems for the driver. Where the front and rear steering gears are mechanically linked by a rotating shaft, as is the cases of Honda and Mazda, less reliance is placed on electronic signal transmission, but there is a marked deficiency in road "feel" to the driver due to high levels of friction of the respective rotating shaft arrangements.

In the Honda Prelude arrangement, a relatively conventional rack and pinion power steering gear is provided in the front steering gear having an additional rack which drives a pinion and rotatable shaft extending to the rear of the vehicle where another full mechanical steering gear is located. The rear steering gear incorporates a function generating mechanism which provides the reversing of the direction of rear steer as a function of steering wheel angle. Since each element of the mechanical linkage imposes additional friction, the overall system is characterised by having poor steering "feel" and poor self-centering action. The front to rear steering shaft requires seals, journals and universal joints at each end which not only add to the friction but, due to the great length of such a shaft, also results in a degree of compliance. To minimize the resulting loss of steering response the components are very robust and accurately fitted, and are therefore heavy and expensive.

In the Mazda MX-6 arrangement magnitude and direction of the rear-steer is made to be a function of not only front steering wheel angle but also vehicle speed. The rear steering gear incorporates a nutating axis or bobbing axis device inclinable either side of a nul position, providing the same-direction rear-steer at high speeds, opposite direction rear-steer at low speeds, and no rear-steer at a nul position corresponding to a "crossover" speed. The axis inclination is varied according to vehicle speed by a stepper motor. By this means a single mechanism provides two separate functions of the rear steering gear, one speed dependent and one front-steer angle dependent. The rear steering gear also incorporates a hydraulic servo-system to provide power actuation to the rear wheels. In this case at least four separate power and/or signal connections are required between the front and rear steering gears.

A rotatable shaft extending between front and rear steering gears is driven by an additional rack and pinion arrangement incorporated in the front steering gear. This arrangement provides the front-steer angle input to the rear steering gear and serves as a fail-safe back-up in the event of hydraulic or electrical failure, at least up to moderate steering loads which apply during medium to high speed driving. Steering loads in parking can be several times as great, and in order to protect the nutating device from damage in a power-off situation, the excess loads are relieved by a spring loaded device which suffices to steer the car once it is in motion. In this Mazda arrangement an overload protection device is positioned on the output or highload side or the rear steer power cylinder in the form of a relatively heavy spring which also functions as a centering device in case of failure of electronic or hydraulic systems. In its function as an overload protector it acts to prevent damaging load being transmitted to the "phase control unit" in the case where high steering resistance loads are applied to the rear steer wheels such as when a rear wheel is parked too close to a curb while the front free to turn.

Also, providing the additional rack in the front steering gear increases the rack length and hence the pivot length between tie rod attachments, enforcing the use of shorter tie rods than optimal, and hence stiffer suspension spring rates.

The required level of robustness of the mechanical linkage, again therefore in this case, introduces friction to the overall steering system, and is difficult to accommodate safely under the relatively flat floor pan of modern front wheel drive vehicle.

SUMMARY OF THE INVENTION

According to the present invention there is a front and rear wheel steering system for a vehicle, comprising a front steer system for front wheels of said vehicle, a rear steer system for rear wheels of said vehicle, said rear steer system comprising a rear steering gear and a rear steer controler, said rear steer controller operable to control the steer position of the rear wheels in accordance with a predetermined functional relationship based on the steer position of the front wheels and at least one varying vehicle operating parameter, said rear steer controller comprising mechanical function generating means and differential means, said differential means detecting the steer position of the rear wheels and controlling actuator means in said rear steering gear, said actuator means applying steering output forces to said rear wheels to maintain said predetermined functional relationship, wherein said rear steer controller is integrated with said front steer system, mechanical feedback means connects said differential means in said rear steer controller and said rear steering gear, said mechanical feedback means providing a signal to said differential means corresponding to the steer position of the rear wheels, said mechanical feedback means being operable at loads substantially less than steering force levels, overload protection means functioning to relieve loads greater than a predetermined load applied to said mechanical feedback means, said overload protection means further acting to restore said predetermined functional relationship upon reduction of loads to a level less than said predetermined load applied to said mechanical feedback means.

The actuator can be either hydraulically or electrically operable, but in either case, the force needed to be transmitted by the mechanical feedback means to operate the different means is only 1/1000 or less than that required to steer with no power assistance. Preferably, a rod or flexible wire may be used operating in a push-pull manner, or alternately a rotating tube, rod or wire of light construction. It is also preferred that a yieldable spring centred device is incorporated to avoid damage to the mechanical feedback means in the event of a temporary overload, and to restore the rear steer actuator to operate in accord with the predetermined functional relationship upon removal of the overload. The need for a robust rotating shaft extending front to rear is thereby avoided, and friction levels are greatly reduced so improving the steering "feel".

It is also preferred that the actuator comprise a short-stroke hydraulic cylinder having a piston rod extending from opposite ends of the cylinder, each piston rod being jointed for connection to respective tie rods for application of steering output forces to said rear wheels, an hydraulic valve providing the control between said differential means and said actuator, said hydraulic valve being integrated with said rear steer controller and coupled to said actuator by two hydraulic lines.

In a still further embodiment the two hydraulic lines and the mechanical feedback means are consolidated into a single control conduit extending between the rear steer controller and the rear steering actuator. For example, these two hydraulic lines and the mechanical feedback means may be arranged concentrically, comprising a metallic tube having therein a second tube which in turn houses the flexible rod or wire. Typical dimensions contemplated by such an arrangement comprise an outer tube of 12 mm diameter with the flexible rod or wire of about 3 mm diameter having an operating travel of approximately 30 mm. Alternatively, the tubes and rod or wire need not be provided in a concentric fashion but may be separately housed. Desirably, those three elements are sheathed together in such a manner as to protect them from damage. Any friction in this mechanical feedback means does not add to total system friction perceived by a driver since it is isolated by the hydraulic valve integrated into the front steering gear. Whatever its configuration, however, the control conduit can be relatively flexible to enable it to be routed around bends which is not possible with the rotating drive shafts of prior art systems.

Where the flexible rod or wire is housed within a tube which is fixed at each end to the front steering gear and rear steering actuator slight movements of these components on their mounts or length changes associated with thermal expansion or contraction will be accommodated by the flexing of the tube and wire without inducing a signal error. As well, the total absence of external seals in the moving elements of the control conduit results in there being substantially no friction and hence no loss of signal due to compliance.

In yet another embodiment the rear-steer controller is directly geared from the front steering input shaft and not from a steering rack as is the case with some known systems. In cases where the front steering gear is also power assisted, this arrangement ensures that optimum responses of the rear steering actuator is provided in that the inherent compliance of the front steering gear power steering control valve is by-passed. Also by avoidance of an additional rack and pinion arrangement, as in the prior art, to provide a signal to the mechanical function generating mechanism, the previously stated compromise in the design of the front steering system is avoided with the flow-on effect of maintaining existing suspension arrangements. In the case of the present invention the front steering gear exclusive of the rear-steer controller can be essentially identical in design to a conventional power rack and pinion steering gear. Also, reliability can be maintained through the avoidance of any electronic connection between the front and rear steering gears as discussed earlier.

By means of this aspect of the invention, the integration of a rear-steer controller in or adjacent to the front steering gear provides that the only connections to the rear steering actuator are two hydraulic lines supplying oil under pressure to its relevant cylinder and a mechanical feedback means comprising a wire or flexible rod providing the feedback signal to the rear-steer controller. By avoidance of the rotating shaft mechanical linkage systems of the prior art the complexity, cost and weight of the system is markedly reduced with considerable advantages in terms of system friction and stiffness.

The output of the mechanical function generating mechanism of a further embodiment connects to an hydraulic valve in the form of a servo-valve via a floating "link" differential device to which is connected or attached the mechanical feedback means from the rear steering actuator. When the feedback from the mechanical feedback means indicates that the rear-steer angle has reached the set-point determined by the mechanical function generating mechanism, the floating "link" is designed to null the servo-valve and generate no further flow through the two hydraulic lines. The spool within the open-centre 4-way servo-valve is hydraulically balanced, hence the forces needed to be generated are only those needed to move the spool to an operative position and hence are insignificant. Such servo-valve differential device arrangements are well known in the art of hydraulic control systems for example that described on page 157 of "Oil Hydraulic Power and its Industrial Applications" by W. Ernest, McGraw-Hill Book Company Inc., 1949.

In yet another embodiment of the invention, the rear steer angle set-point, provided by the mechanical function generating mechanism contained in the rear-steer controller integrated in the front steering gear, actuates (via the floating "link") an electrical switch, rather than the servo-valve. Hence the two hydraulic lines are replaced by electrical wiring to a rear steering gear mounted electric motor actuator. The electrical switch directs the electric motor to actuate the rear steering gear either right or left depending upon the error signal received via feedback through the mechanical feedback means. The electrical switch will at all times occupy one of three positions; right steer, null, or left steer; hence the rear steering gear mounted electric motor actuator is not energised when the switch is in the null position. Alternatively the electrical switch can take the form of a potentiometer with a power amplifier driving the electric motor actuator in a classic closed loop proportional control system.

However, as stated earlier, in hydraulic form the rear steering actuator comprises a hydraulic cylinder. The rear steering actuator piston rod position (and hence rear steering angle) is transmitted to the feedback wire or rod by an overload protection means in the form of a spring-loaded detent device which will yield under a predetermined load of, say 3-5 kg, thereby avoiding buckling the wire or rod or damaging the rear-steer controller.

In a preferred form the piston of the rear steering actuator is provided with a deep radial notch into which a tapered plunger is driven by a spring in manner akin to that shown in Lotus U.S. Pat. No. 4,770,264. In accordance with a second aspect of the invention, in contrast to the disclosure in that patent, the plunger is normally restrained in a retracted position by a trigger arrangement so that in the event of overload occurring and being detected by the deflection of the spring-loaded detent device, the trigger is fired releasing a tapered plunger which then urges the rear steering gear to a centred or straight-ahead position irrespective of normally occurring loads. Hence triggering of the plunger is effected by malfunction of the hydraulic assist system or by overloading of the rear steering gear causing a loss of maintenance of the predetermined functional relationship. A typical overload situation is where the rear wheels are restrained from turning when the vehicle is parked too close to a kerb while the front wheels are free to turn.

Of course sudden cessation of flow can occur due, for example, to engine stall, pump belt-drive failure, hydraulic line breakage, or low oil level. (Note, however, that the most frequently occurring hydraulic failures are experienced only at maximum pressure as when parking, and hence give warning of failure and post no hazard in driving). According to the invention both steering systems are arranged in series, so cessation of flow affects both front steering gear and rear steering actuator at the same time. Desirably, a flow detector switch is provided in the front steering gear at the return-to-tank connection which closes an electrical circuit to display a warning light to the driver in respect of both systems. Now as the driver continues to steer the car in a manual mode as is current practice in two-wheel steer systems, the resulting positional difference between the front steering gear and the rear steering actuator causes triggering of the above mentioned plunger, centering the rear steering actuator as earlier described.

Prior art four wheel steering systems typically have mechanical, hydraulic and electrical elements, the failure of any component of which could precipitate a malfunction of the rear steering gear. According to the present invention great reliance is placed on simple mechanical devices, reducing the number of components, and by limiting the load which can ever be carried by the mechanical elements through a load limited device.

A third aspect of the invention relates to the above mentioned mechanical function generating mechanism. Prior art rear wheel steering mechanisms provide a ratio between the rate of change of the rear steer angle and that of the front steer angle which is a maximum (for example ⅓) when the vehicle is moving straight and zero at maximum steering wheel angle. This arrangement serves to maximize the benefit of rear steering in the most frequently employed straight-ahead driving conditions without requiring excessively large steer angles of the rear wheels when cornering. Thus, it has been found that at low speeds when large front steer angles are used, a rear-steer angle greater than about about 6 deg. is disconcerting to the driver. In addition, large angles of turn of the rear wheels would cause them to intrude on trunk storage space or rear engine compartment space.

In prior art devices where the rear-steer is also dependent on the vehicle speed (for example Mazda U.S. Pat. No. 4,572,316 and Toyota U.S. Pat. No. 4,781,261) a single mechanism provides both functions, namely, the steer angle dependent characteristic and the speed dependent characteristic.

The part of the mechanism used to provide the ratio of rear-steer angle to front-steer angle just referred to, typically varying from ⅓ when straight ahead to zero at each lock, necessarily has a sine curve characteristic in these prior art devices. The second function of the mechanism serves to change the amplitude and sign of this sine curve as described earlier.

According to this third aspect of the present invention these two functions of the rear-steer controller are performed by two separate function generating mechanisms arranged in series, with the output of a first front-steer angle dependent mechanism providing the input to the second, speed dependent mechanism.

By this means the front-steer angle dependent mechanism can be provided with widely differing characteristics to suit particular vehicles. Thus a sine curve function necessarily provides that the maximum value of the above mentioned ratio is twice its mean value, whereas it will often be desirable to have a maximum value of three or more times its mean value. Such characteristics cannot be provided by families of mechanisms limited to sine curve functions.

In this aspect of the present invention the front-steer angle dependent function generating mechanism is in the form of a pin and slot device similar to one quadrant of the well known Geneva indexing mechanism wherein the driving member rotates about an axis and carries a pin offset from that axis which engages a pivoted driven member having a radial slot. The ratio between the offset of the pin in the driving member and the radius at which the pin engages the slot of the driven member with respect to its own axis determines the basic characteristic of the mechanism. Such devices may provide a relationship between input and output of a substantially sinusoidal form having a maximum ratio twice the mean ratio or alternatively a non-sinusoidal form having a maximum ratio say, three times that of the mean ratio. Such flexibility is extremely important in matching a four wheel steering system to a particular vehicle.

According to this embodiment, the driven member, in addition to the radial slot just referred to, is provided with an arcuate slot extending either side of its axis. A swinging link is arranged having at one end a pin engaging the arcuate slot, the axis of the swinging link being generally at right angles to the arcuate slot of the driven member when both the driven member and the swinging link are in their mid positions, the other end of the swinging link being pivotally connected to an equalising bar.

The swinging link is also supported on a pivot such that movement about this pivot transverse to the longitudinal axis of the swinging link cannot occur. In the mid position of the swinging link, when its pin is at the centre of the arcuate slot adjacent to the axis of the driven member, angular motion of the driven member produces no longitudinal motion of the swinging link and hence no displacement of the equalising bar. However as the swinging link moves towards the right or left hand ends of the arcuate slot, longitudinal motion of the swinging link occurs with consequent displacement of the equalising bar. The direction and magnitude of this displacement varies with the position of the pin in the arcuate slot.

The angular position of the swinging link is controlled by an actuator in accordance with vehicle speed or other vehicle parameter, and serves to cause the rear wheels to turn in the same direction as the front wheels when the swinging link engages, for example, the left hand end of the arcuate slot, and in the opposite direction when the swinging link engages the right hand end. Preferably the actuator comprises a small open ended cylinder having therein a piston spring loaded towards the closed end. Oil is admitted to the closed end from a tapping located at the return-to-tank connection from the front steering gear, where a small back pressure solenoid valve may be located as taught in U.S. Pat. No. 4,561,516. In that patent this variable back pressure is used to cause the steering effort to change in accordance with vehicle speed. According to this preferred form of the third aspect of the present invention this variable pressure is also used to position the swinging link according to vehicle speed, and so appropriately control the rear./front steer relationship as determined by the actual geometry of this speed dependent function generating mechanism.

The differential device in the form of an equalising bar is pivotally connected at one point along its length to the electrical switch or servo-valve operating the rear-steer actuator and at another point to the mechanical feedback means from the rear-steer actuator. By this means it acts as a differential device to co-ordinate the position of the rear steering actuator with the set-point determined by the mechanical output of the function generating mechanism.

BRIEF DESCRIPTION OF THE DRAWINGS

The different aspects of the invention will now be described by way of example with reference to the accompanying drawings, in which:

FIG. 8 is a longitudinal section view of the rear steering actuator of FIG. 1 and includes partial view FIG. 8a.

DETAILED DESCRIPTION OF THE PREFERRED EMBODIMENTS

Figure 1:
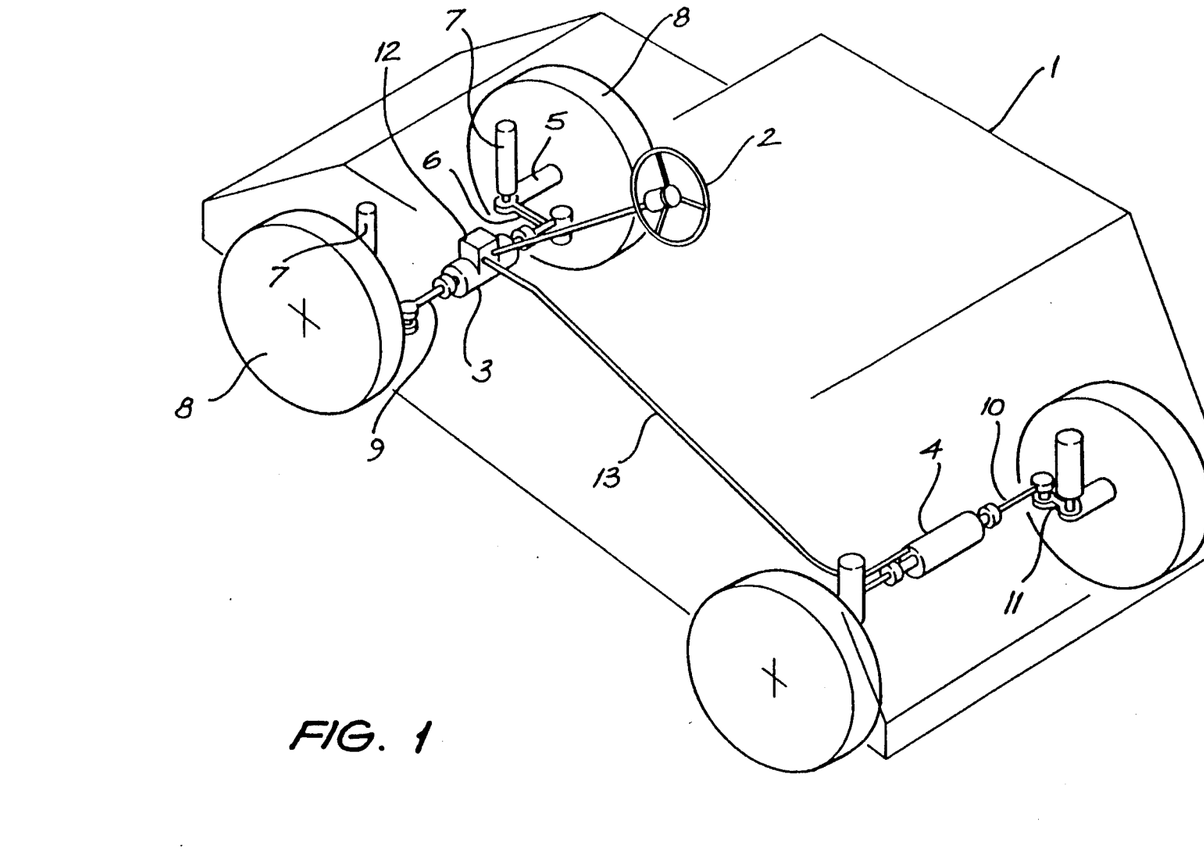
FIG. 1 is a general arrangement isometric view of a vehicle incorporating embodiments of aspects of the present invention.

FIG. 1 shows a vehicle 1 having a steering wheel 2 connected to a front steering gear 3 of the rack and pinion type and a rear steering actuator 4.

Front wheels 8 are journalled on axles 5 which are secured tot eh lower end of McPherson structs 7 and carry steering radius arms 6 extending towards the rear of the car. To the ball end of these steering radius arms are attached tie rods 9 of front steering gear 3. Similarly, in the base of rear steering actuator 4, corresponding tie rods 10 extend to radius arms 11. The front steering gear 3 incorporates a rear-steer controller 12 and extending from this rear-steer controller 12 is control conduit 13.

Figure 2:
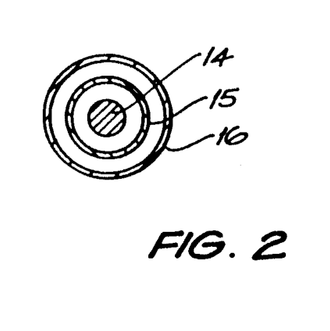
FIG. 2 is a transverse cross sectional view of a concentric type control conduct.

Referring to FIG. 2, which is a transverse cross sectional view through the concentric type control conduit 13 of FIG. 1, there is shown a flexible wire 14 housed within left-steer hydraulic tube 15 which itself is housed within right-steer hydraulic tube 16.

Figure 3:
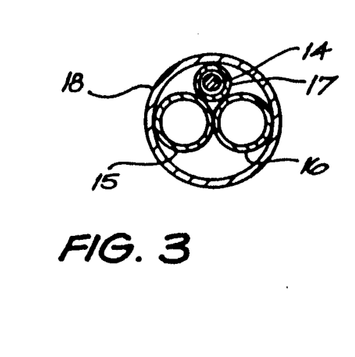
FIG. 3 is a transverse cross-sectional view of an alternative type control conduit.

FIG. 3 shows a transverse cross section view through an alternative type control conduit 13 which comprises a left-steer hydraulic tube 15, a right-steer hydraulic tube 16, and a separate signal tube 17 containing flexible wire 14 all contained within a protective sheath 18.

Figure 4:
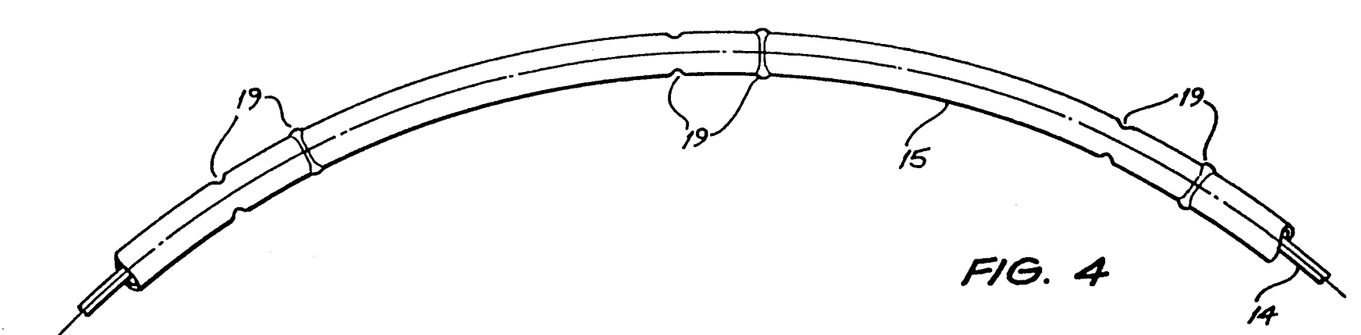
FIG. 4 is a plan view of a length of left-steer hydraulic tube 15 and flexible wire 14 of FIG. 2.
Figure 5:
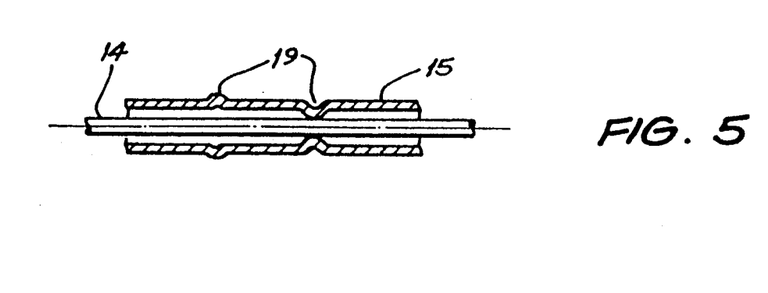
FIG. 5 is a longitudinal sectional view of a part of FIG. 4.

FIGS. 4 and 5 show a means whereby flexible wire 14 is retained substantially axially of left-steer hydraulic tube 15 even when tube 15 is bent to follow a curved path between front steering gear 3 and rear steering actuator 4. By providing pairs of spaced apart orthogonal transverse crimps 19 along the length of left-steer hydraulic tube 15, flexible wire 14 is restrained to follow its centre line.

Figure 6:
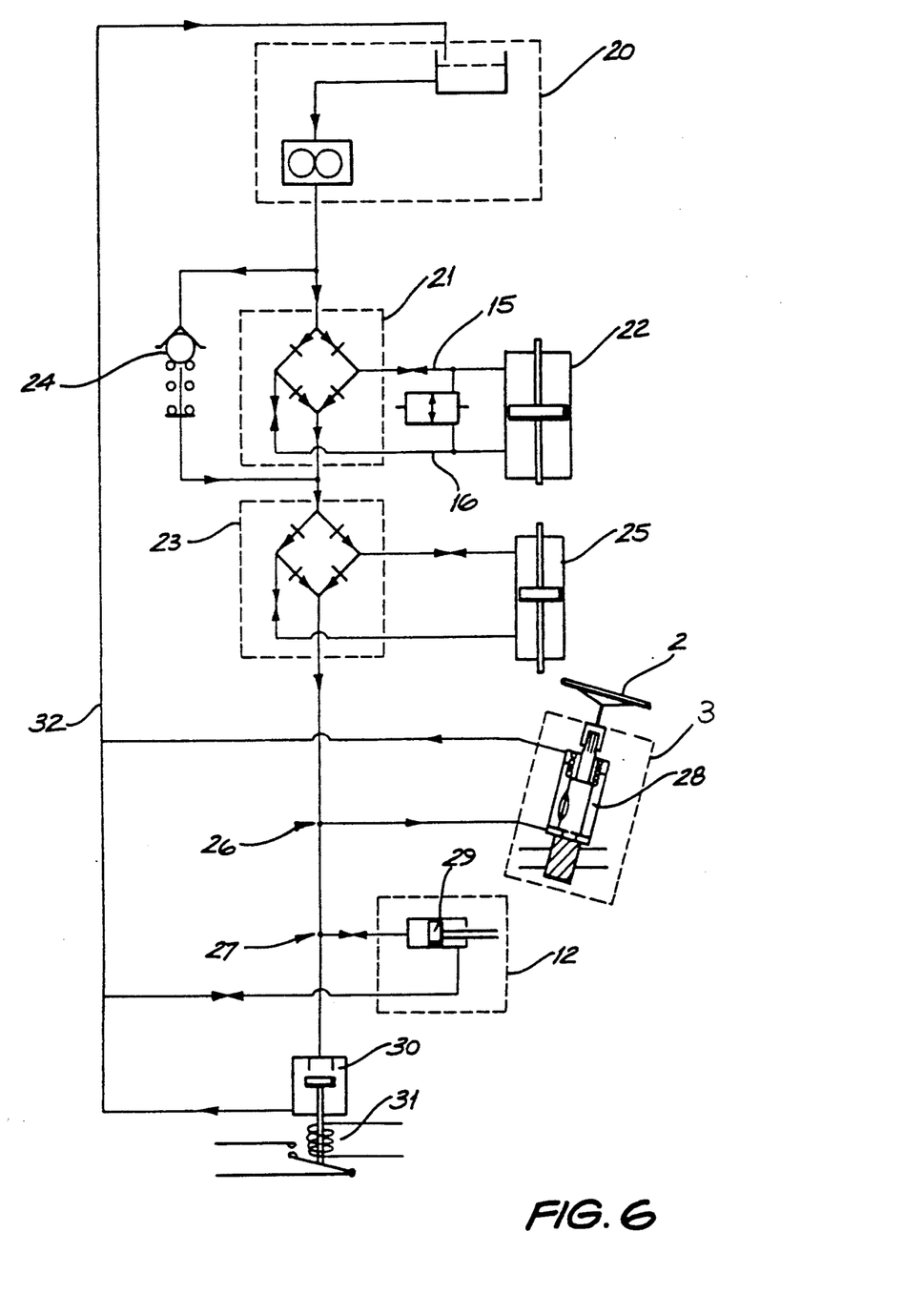
FIG. 6 is a schematic view of the hydraulic circuit according to the preferred embodiment of the first aspect of the invention.

FIG. 6 shows a schematic view of the hydraulic circuit according to the preferred embodiment of the first aspect of the invention. A single pump and reservoir 20 directs oil firstly to rear-steer controller 12 incorporating a servo-valve 21 which is here shown as being analogous to an electrical Wheatstone bridge. From servo-valve 21 oil is directed to and from the rear steering actuator power cylinder 22 via the concentric hydraulic tubes illustrated as 15 and 16 in FIG. 2.

Oil on leaving servo-valve 21 proceeds to a front steering gear control valve 23. In the event of temporarily impeded movement of the rear steering gear, by-pass relief valve 24 is provided to continue to supply oil to front steering gear control vale 23. Typically, it is arranged that the by-pass pressure of relief valve 24 is only about twenty five percent of the relief valve pressure incorporated in the pump 20. The piston of rear steering actuator power cylinder 22 is correspondingly enlarged compared to that of the front steering gear power cylinder 25 so that the rear tyres can be turned when the car is stationary as occurs with the front steering gear. The resulting lesser rate of steering of the rear wheels as compared to that of the front wheels is appropriate to the different relative lock angles—typically 6 deg. as compared to 30 deg.

Front steering gear control valve 23 controls the supply of oil to front steering gear power cylinder 25 in conventional manner. From here oil does not return directly to the oil tank of pump 20, but rather proceeds through two T junctions shown as 26 and 27 to respective speed sensitive control pistons 28 and 29 both incorporated in front steering gear 3. Speed sensitive control piston 28 forms part of the front steering gear control valve 23 while speed sensitive control piston 29 forms part of the rear-steer controller 12. Oil is then conveyed to back pressure control valve 30 which incorporates solenoid 31. From here the oil returns through return line 32 to the tank incorporated in pump 20. The specific arrangement of speed sensitive valve is that shown in U.S. Pat. No. 4,561,516, is illustrated her in cross section in FIG. 7, and serves to substantially decrease the amount of power assist provided by the front steering gear as vehicle speed increases, as is appropriate to providing optimum road 'feel'. Note that speed sensitive control piston 28 is actually the sleeve element of front steering gear control valve 23.

Figure 8:
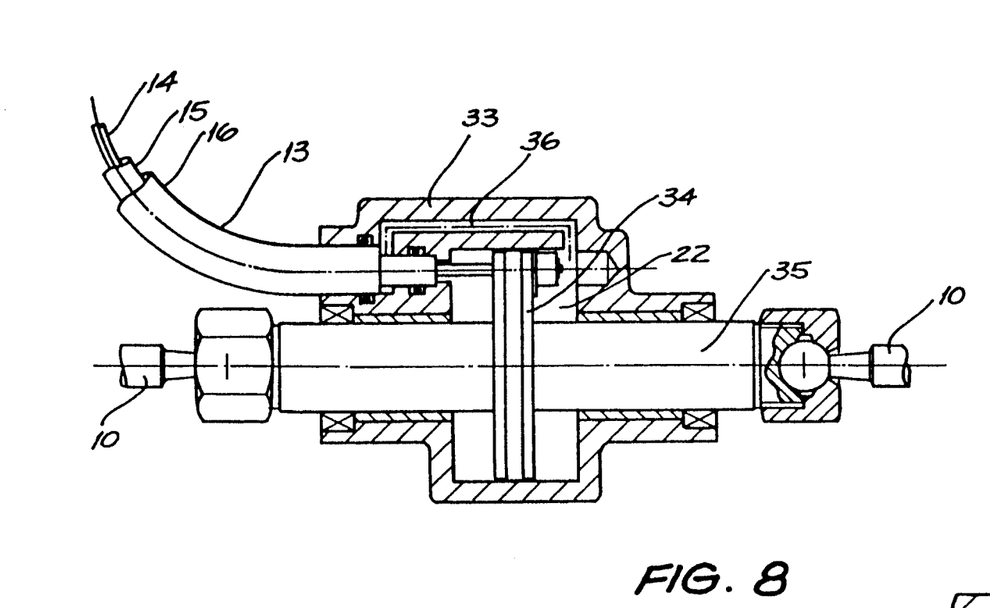

FIG. 8 shows a longitudinal sectional view of rear steering actuator 4 comprising a housing 33 containing a piston 34 sliding in power cylinder 22 and secured to piston rod 35, this in turn pivotably attached by ball joints at opposite ends to respective tie rods 10.

Control conduit 13 terminates within housing 33 and communicates fluid, flowing in the annular space between tubes 15 and 16 via port 36 to the right hand side of power cylinder 22 as viewed in FIG. 8 whereas fluid flowing in the annular space between tube 15 and signal wire 14 communicates to the left hand side of power cylinder 22.

Figure 8A:
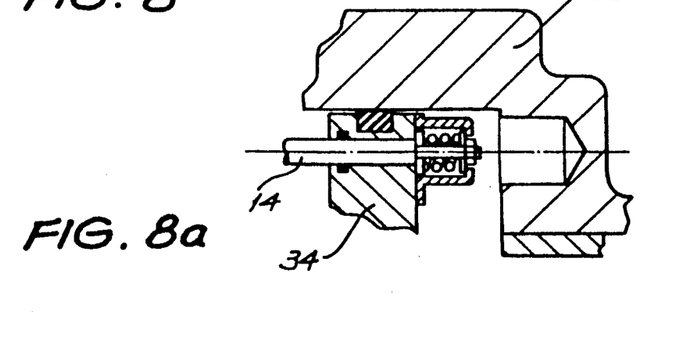

Flexible feedback wire 14 acts as a mechanical feedback means, and is coupled to piston 34 so that the position of piston 34 in power cylinder 22 is always communicated to the rear-steer controller 12 integrated in front steering gear 3. If, for any reason, the rear steering actuator is temporarily restrained from following the front steering gear, the light construction rear-steer controller 12 and the feedback wire 14 must be protected from overload and, to this end, wire 14 is coupled to piston 34 as illustrated in partial view FIG. 8a, which temporarily relieves the excess load without losing the relative positions int he well known manner of a double-trapped spring.

The rear-steer controller may incorporate either one mechanical function generating mechanism (e.g. that shown in Mazda U.S. Pat. No. 4,572,316) or two such mechanisms in series, in each case driving a differential device and a servo-valve.

The embodiment described will deal with the case where two mechanical function generating mechanisms are used in series.

Figure 9:
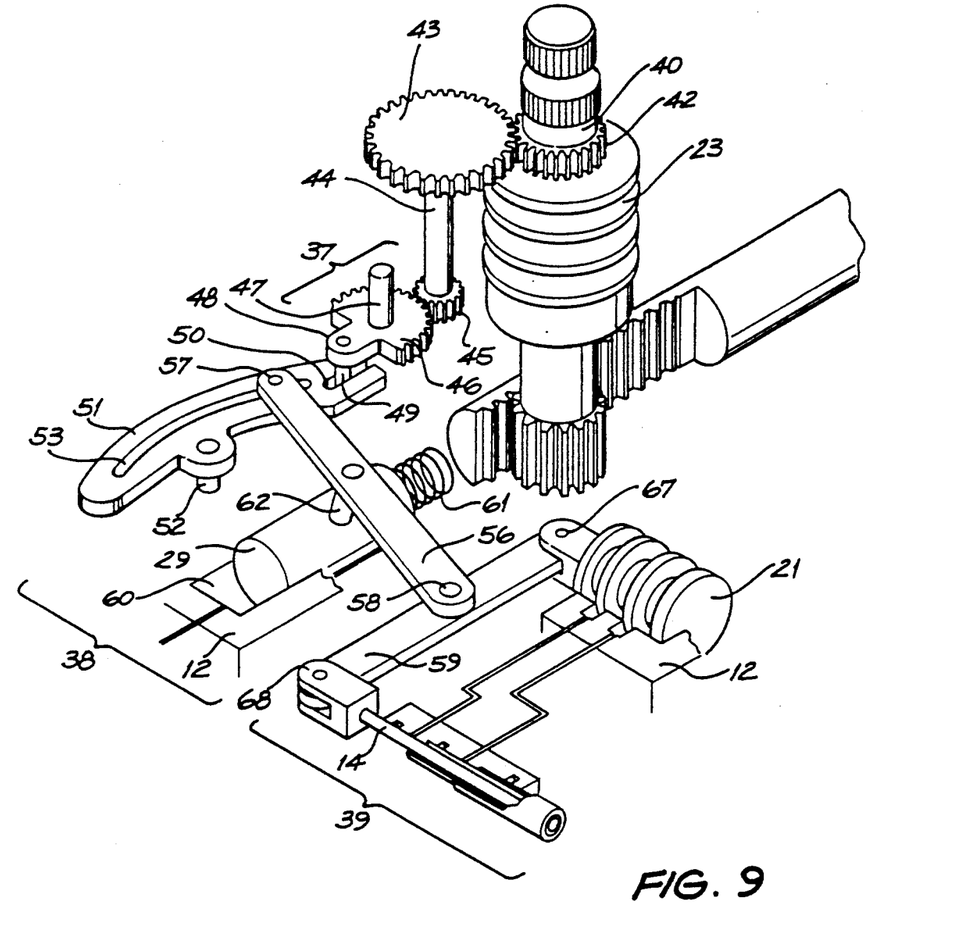
FIG. 9 is an isometric view of the preferred embodiment of the rear-steer controller of FIG. 1.

In FIG. 9, mechanism 37 provides the angle-dependent characteristic, mechanism 38 the speed-dependent characteristic and 39 is the differential device linking mechanism 38, servo-valve 21, and flexible feedback wire 14 of control conduit 13.

Figure 7:
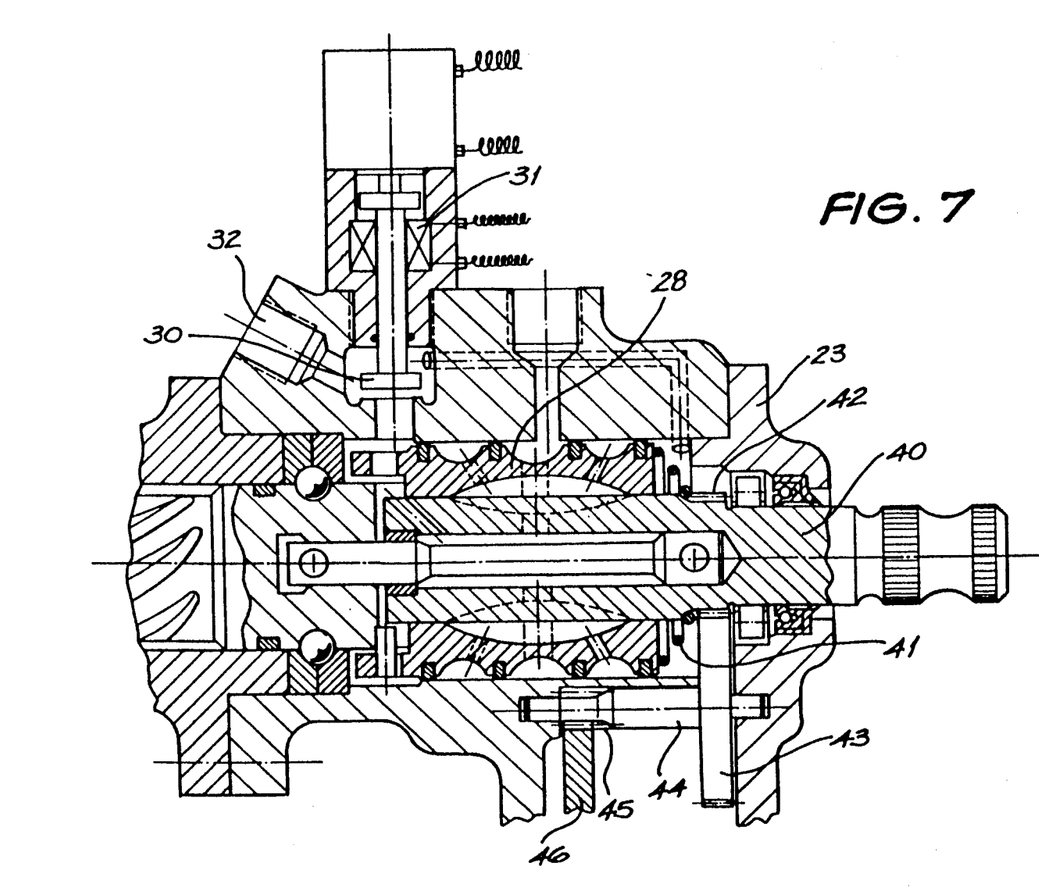
FIG. 7 is a cross-sectional view of a speed sensitive valve employed in the hydraulic circuit of FIG. 6.

Front steering gear control valve 23 is of conventional rotary valve type but preferably includes provision for variation of steering "feel" as described in U.S. Pat. No. 4,561,516. According to that disclosure (refer FIG. 7) solenoid 31 partly closes back pressure control valve 30 so restricting the hydraulic path to return line 32, thus raising the pressure acting on the speed sensitive control piston 28, in the manner described in that document. As stated earlier speed sensitive control piston 28 comprises the rotary valve sleeve member, slideable on input-shaft 40 against a reaction force provided by spring 41. Referring to FIGS. 7 and 9 input shaft 40 incorporates gear 42 which drives gear 43 of layshaft 44 having thereon pinion 45 which, in turn, engages part-gear 46 having, pivoted on axle 47, extending radially therefrom, lug 48 carrying pin 49. This pin engages slot 50 of slotted lever 51 pivoted about fixed axis 52. The gearing ratio between input shaft 40 and part-gear 46 is approx. 4:1, so that two turns of shaft 40, i.e., of steering wheel 2 in FIG. 1, being typically from stop to stop, results in one half turn of part-gear 46 and about 20 degrees pivotal movement of slotted lever 51 about axis 52. In the following detailed description of the operation of the mechanical function generating mechanisms 37 and 38 refer also to FIG. 10. Slotted level 51 has a second, blind-ended arcuate slot 53 which as a centre of radius 54 in the centred position of lever 51 as illustrated. When part-gear 46 is rotated 80° degrees so that pin 49 moves to position 49a, slot 50 moves to position 50a causing slotted lever 51 to rotate about axis 52 so that the centre of radius of arcuate slot 53 now occupies position 54a. The right hand end of arcuate slot 53 indicated as 55b in the centred position has now moved to 55a.

Figure 10:
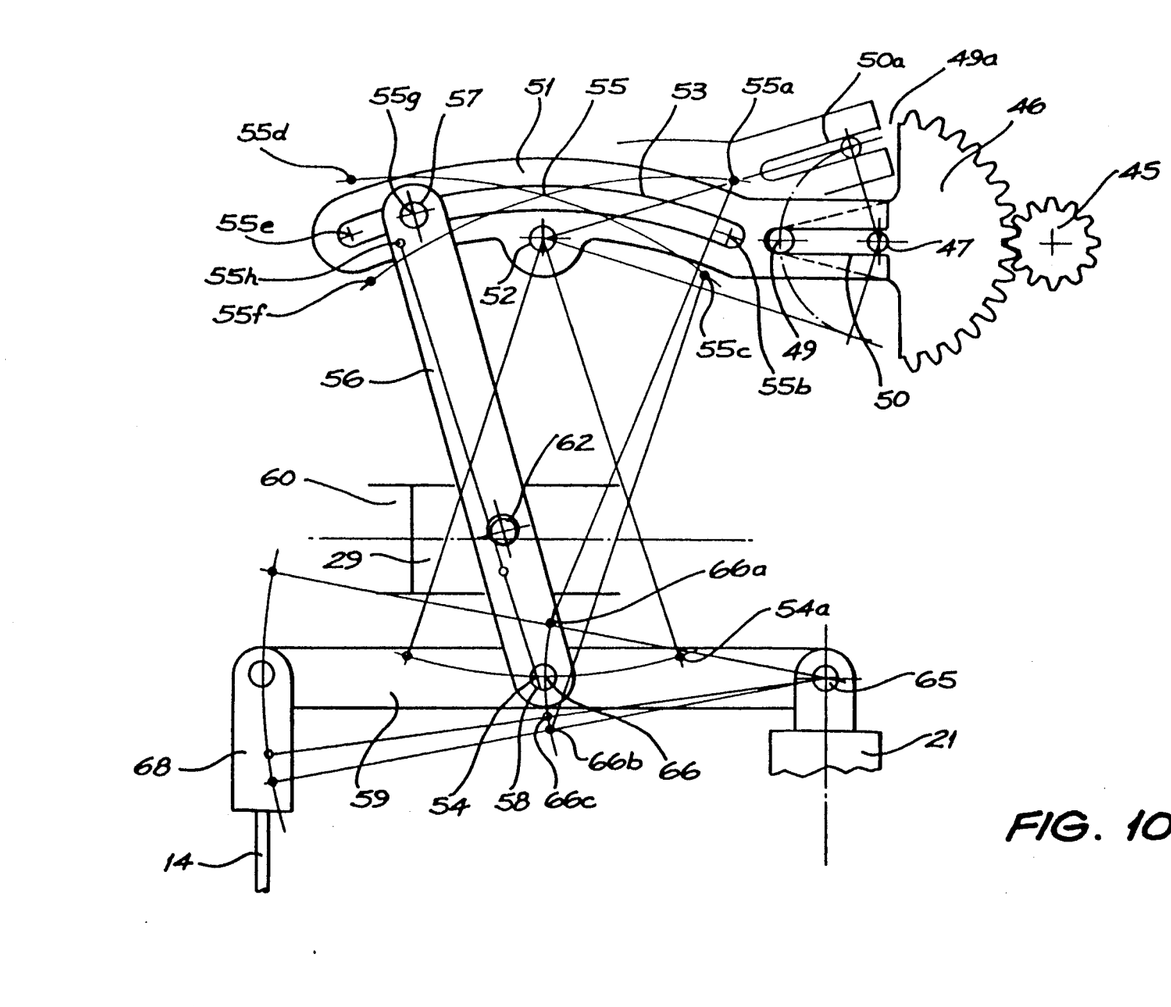
FIG. 10 is a schematic layout showing the operation of the function generating mechanism shown as part of the rear-steer controller in FIG. 9.
Figure 11:
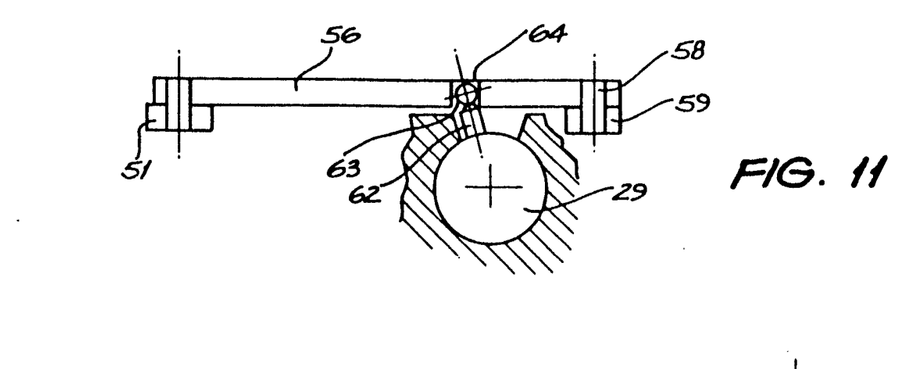
FIG. 11 is a sectional view of the function generating mechanism shown in FIG. 10.

A swinging link 56 is provided with two pins 57 and 58, pin 57 being engaged in slack-free engagement with arcuate slot 53 and pin 58 being pivoted to link 59. Link 56 is illustrated for clarity in a position where pin 57 occupies a position 55g displaced from mid-position 55. The extreme positions of pin 57 are indicated as 55e and 55b when arcuate lever 51 is in the mid-position shown. Link 56 swings either side of mid-position 55 under the control of speed sensitive control piston 29 which slides axially in a bore 60 provided in the rear-steer controller 12 integrated into the front steering gear 3. Fluid pressure in bore 60 is communicated from T junction 27 and moves piston 29 in opposition to spring 61. Movement of piston 29 is transmitted to link 56 by pin 62 extending radially therefrom and having spherical ball end 63 engaged in close-fitting hole 64 in link 56, as shown in FIG. 11.

It will be recalled that fluid pressure in bore 60 is dependent on vehicle speed, so that link 56 occupies a position such that pin 57 is at its mid-position 55 at the 'crossover' speed referred to earlier, where there is no rear-steer irrespective of the position of slotted lever 51, that is, irrespective of rotation of the steering wheel 2. Pin 57 will occupy position 55e when the vehicle is travelling at high speed when back-pressure control valve 30 is relaxed due to the application of low current to solenoid 31 and hence low pressure to piston 29. On the other hand it will occupy position 55b when the vehicle is stationary and maximum current is supplied to solenoid 31 and hence maximum pressure is applied to piston 29 (normally about 3 bars).

This same variation of pressure applied to piston 29 will also be applied to speed sensitive control piston 28 via T junction 26. As stated earlier piston 28 is actually the sleeve member of the front steering gear control valve 23, a rotary valve which enables steering effort to be modulated as a function of vehicle speed according to the teaching in U.S. Pat. No. 4,561,516. Hence steering effort is made to be minimum during parking and other low speed manoeuvres and maximum during high speed highway driving.

Link 59 acts as a differential means, and is pivoted at one end by pin 65 to the forked end of servo-valve 21 which moves only a fraction of a millimeter to direct oil to and from the rear steering actuator power cylinder 22. Now the pin 58 moves back and forth from a mid-position 66 to extreme positions 66a and 66b, a distance of about +/−7 mm but because lever 59 is pivoted about virtually fixed point 65, the travel at the far end of lever 59 is about doubled to +/−15 mm. This travel is imparted to flexible feedback wire 14 through clevis 68, and corresponds to the travel required to steer the rear wheels through an angle of about +/−6 degrees from a central position.

Consider now when the vehicle is travelling at some speed between "crossover" speed and maximum speed, and pin 57 occupies the intermediate position 55g illustrated in FIG. 10. Now, if steering wheel 2 is rotated clockwise, part-gear 46 will also rotate clockwise turning slotted lever 51 anticlockwise about axis 52. This will carry pin 57 from position 55g to a position 55h and hence pin 58 from mid position 66 to position 66c, thus causing rear-steer in the same direction as front-steer.

If now the speed decreases so that lever 56 carries pin 57 to the right-hand end of slot 53, as at 55b, then a clockwise rotation of the steering wheel 2 will cause pin 58 to move in the opposite direction to that just described—that is, to limit position 66a rather than 66c, so that the rear-steer is now in the opposite direction as the front-steer.

The amount of displacement of pin 58 will also depend on the angle of displacement of slotted lever 51, which will cause the low-speed end of slot 53, 55b, to move to position 55a in an extreme clockwise steering wheel rotation and to 55c in an extreme anticlockwise steering wheel rotation. The net travel of pin 58 will thus be the algebaic product of the output of the mechanisms 37 and 38, including both negative and positive values.

Figure 12:
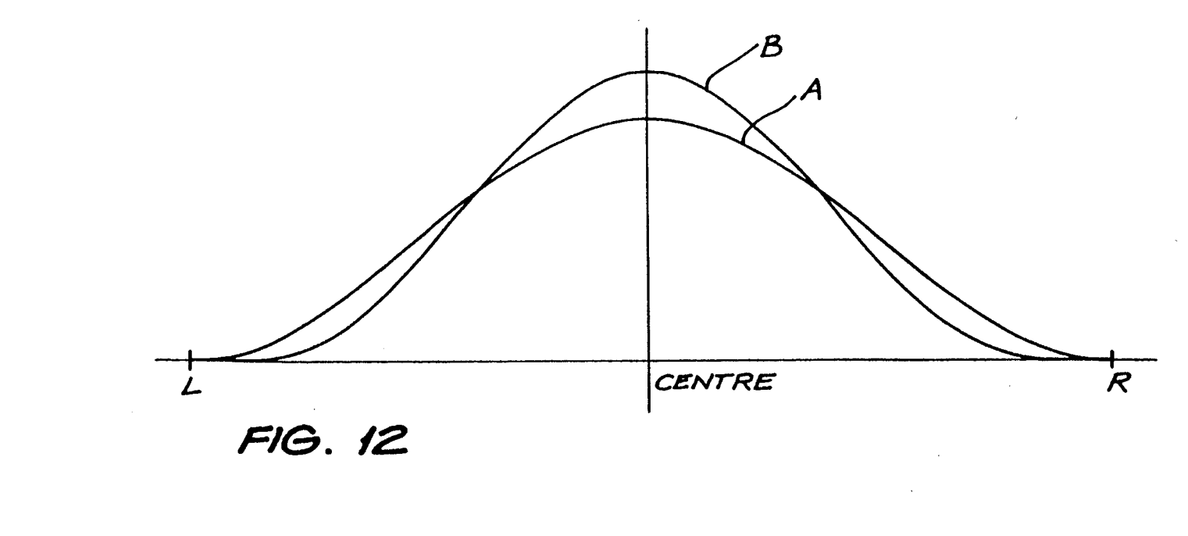
FIG. 12 is a plot R vs X of the function generating mechanism shown in FIGS. 9, 10 and 11.

Of course the rotation of slotted lever 51 about axis 52 will be determined by the pin and slot device 49–50 shown as mechanism 37, and will approximate a sine curve relationship, illustrated as curve "A", FIG. 12, for the proportions illustrated in FIG. 9. In FIG. 12, rotation of the front wheels is shown as the horizontal ordinate extending between left lock position L and right lock position R. The vertical ordinate corresponds to the rotation of the rear wheels, having a maximum value of ⅓ of front wheel rotation at the centre position. By changing the distance between pivot 47 and pin 49 relative to the distance between pivot 47 and pivot 52, a curve of the type shown as B in FIG. 12 can be achieved, so that the above ratio of ⅓ becomes 1/2.5, thus increasing the amount of rear steer in the centre position without increasing the maximum angle of turn of the rear wheels.

In the event that the position of the rear-steer piston 34 as transmitted by flexible feedback wire 14 does not correspond with a position determined by linkage mechanisms 37 and 38, then servo-valve 21 (FIG. 9) will move to direct hydraulic fluid to the appropriate side of piston 34.

The rear steering actuator will now be described with reference to FIGS. 13–16 which comprises different views of the rear steering actuator 4 or FIG. 1 and being a modification of the layout of that steering actuator as shown in FIG. 8.

Figure 13:
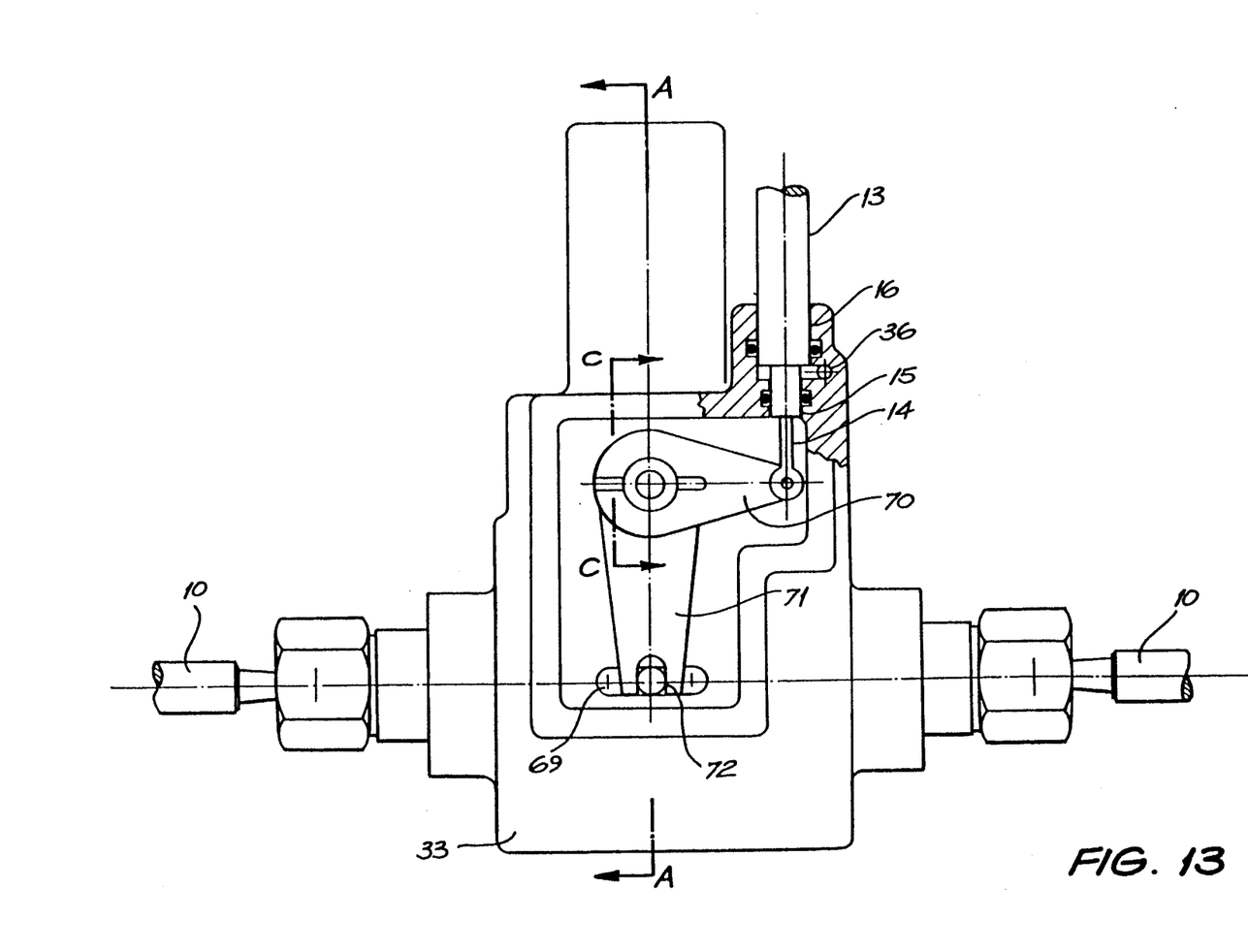
FIG. 13 is a plan view of a modified rear steering actuator (compared with FIG. 8) with top cover plate removed.
Figure 14:
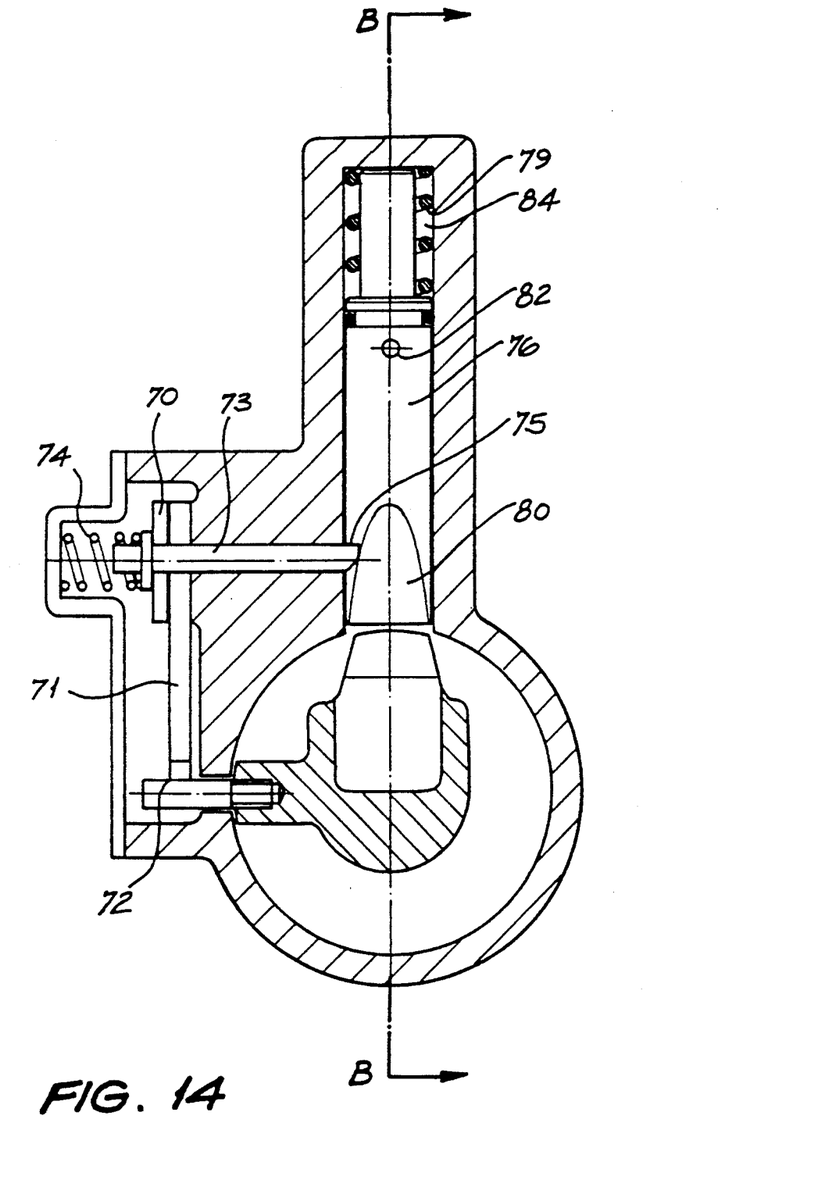
FIG. 14 is a section on AA of FIG. 13.
Figures 15, 16:
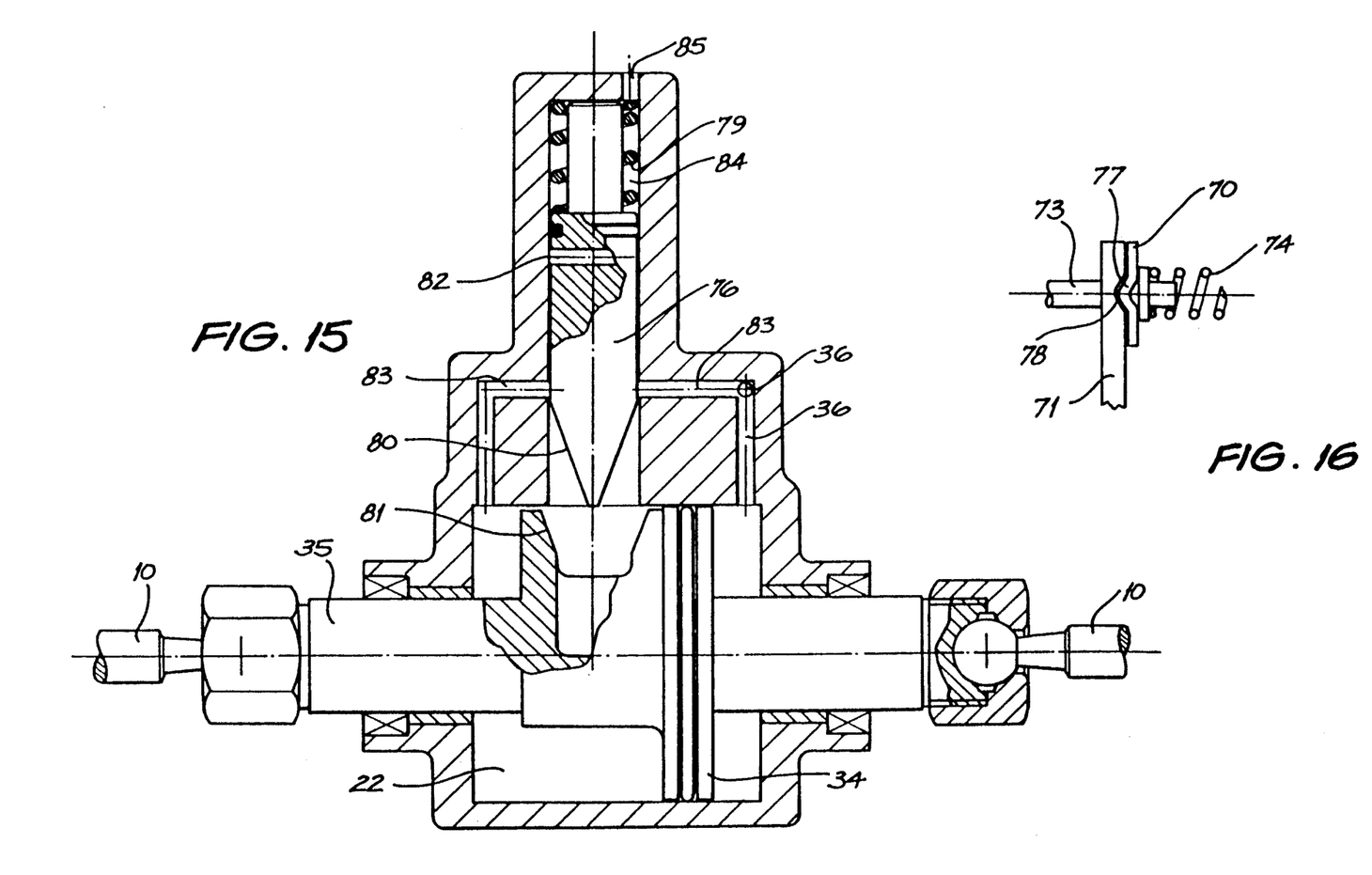
FIG. 15 is a section on BB of FIG. 14.
FIG. 16 is a section on CC of FIG. 13.

In FIGS. 13, 14 and 15, control conduit 13 comprising hydraulic tubes 15, 16, and flexible feedback wire 14, is mounted to rear steering gear housing 33. Hydraulic fluid in the annular space between tubes 15 and 16 communicates to rear-steering actuator cylinder 22 on the right-hand side of piston 34 (as shown in FIG. 15) via L shaped port 36. Hydraulic fluid in the annular space between tube 15 and flexible wire 14 communicates to rear-steering gear cylinder 22 on the left-hand side of piston 34 via opening 69. Flexible feedback wire 14 is connected to bell crank arm 70 while the other bell crank arm 71 is connected to piston rod 35 via pin and slot arrangement 72. Therefore bell crank arm 71 follows the movement of piston 34.

Bell crank arms 70, 71 are not fixedly connected and form a yieldable detent mechanism biased together by a spring 74 so that, at a predetermined minimum torque applied to these arms about their axis, relative rotation occurs. The relative rotation between arms 70, 71 then causes trigger pin 73 to be lifted against the bias of spring 74 out of engagement with latch 75 in plunger 76.

FIG. 16 shows one arrangement between arms 70, 71 which has the effect of raising trigger pin 73 against spring 74 as those arms are rotated relative to each other. The torque required to cause relative rotation between arms 70, 71 being determined by the preload in spring 74 combined with the inclination angle of notch 77 in arm 70 and complementary notch 78 in arm 71.

Once trigger pin 73 is removed from engagement in latch 75, plunger 76 is driven towards cylinder 22 under the preload of spring 79 so that taper 80 of plunger 76 moves into a complementary recess 81 in piston rod 35 to move piston rod 35 and hence piston 34 to a position where the rear wheels are locked in the straight ahead steering position. Appropriately, plunger 76 only moves slowly to "centralise" the rear steering gear after trigger pin 73 is withdrawn to avoid any sudden change in rear wheel steering effect that could affect vehicle stability.

When plunger 76 is fully home in recess 81 the fluid pressure on opposite sides of piston 34 is equalised by the alignment of port 82 in plunger 76 with ports 83 extending from port 36 in housing 17, providing an hydraulic fluid connection between opposite sides of piston 34.

To reset the rear wheel steering gear and hence re-establish the predetermined functional relationship once an overload or malfunction has been removed, all that is required after the vehicle is made stationary is to await a rise in hydraulic pressure within cylinder 22 to a level which overcomes the force of spring 79 and forces plunger 76 into its retracted position, as shown in FIGS. 14 and 15, whereupon equalisation of hydraulic pressure on opposite sides of piston 34 is removed as port 82 moves out of alignment with ports 83 so that arms 70, 71 re-engage as shown in FIG. 16 to allow trigger pin 73 to re-latch in latch 75 in plunger 76 as shown in FIG. 14. The movement of plunger 76 against spring 79 is further facilitated as the chamber 84 containing spring 79 is open to atmospheric pressure through bore 85. In this way rear steer actuation according to the predetermined functional relationship between front and rear steer angles and vehicle speed determined by the mechanical function generating mechanism is re-established.

In the case of an integral (steering box) type steering gear arrangement, the control conduit 13 may be attached directly to the Pitman arm at a point near its axis of rotation. However, in all cases a four wheel steering system incorporating a low force level mechanical feedback means transmitter will provide the same benefits of low cost, flexibility in terms of vehicle packaging, low friction and high degree of immunity to system failure.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A front and rear wheel steering system for a vehicle, comprising a front steer system for front wheels of said vehicle, a rear steer system for rear wheels of said vehicle, said rear steer system comprising a rear steering gear and a rear steer controler, said rear steer controller operable to control the steer position of the rear wheels in accordance with a predetermined functional relationship based on the steer position of the front wheels and at least one varying vehicle operating parameter, said rear steer controller comprising mechanical function generating means and differential means, said differential means detecting the steer position of the rear wheels and controlling actuator means in said rear steering gear, said actuator means applying steering output forces to said rear wheels to maintain said predetermined, functional relationship, wherein said rear steer controller is integrated with said front steer system, mechanical feedback means connects said differential means in said rear steer controller and said rear steering gear, said mechanical feedback means providing a signal to said differential means corresponding to the steer position of the rear wheels, said mechanical feedback means being operable at loads substantially less than steering force levels, overload protection means functioning to relieve loads greater than a predetermined load applied to said mechanical feedback means, said overload protection means further acting to restore said predetermined functional relationship upon reduction of loads to a level less than said predetermined load applied to said mechanical feedback means.

2. A front and rear wheel steering system as claimed in claim 1 comprising a safety device, said safety device comprising detection means for detecting that said rear wheels are not steered in accordance with said predetermined functional relationship, centering means triggerable by said detection means to urge and lock said rear wheels to a straight ahead condition upon detection by said detection means that the steer position of said rear wheels is not in accordance with said predetermined functional relationship.

3. A front and rear wheel steering system as claimed in claim 2 wherein said detection means is integrated with said overload protection means, said detection means comprising two coaxially supported relatively rotatable notched plates axially biased together, said notched plates functioning to axially separate upon the application of a predetermined minimum torque applied to said plates, said predetermined minimum torque corresponding to said predetermined load applied to said mechanical feedback means, the axial separation of said notched plates acting to trigger said centering means.

4. A front and rear wheel steering system as claimed in claim 3 wherein axial separation of said plates effects movement of a spring biased trigger pin releasing said centering means to urge and lock the rear wheels.

5. A front and rear wheel steering system as claimed in claim 2 or 3 wherein upon detection by detection means that said predetermined functional relationship again applies to the control of the rear wheels, said safety device functions to control removal of said centering means from locking said rear wheels to a straight ahead condition.

6. A front and rear wheel steering system as claimed in claim 2 wherein said centering means comprises a spring force biased tapered plunger.

7. A front and rear wheel steering system as claimed in claim 6 wherein removal of said centering means is under the action of hydraulic pressure applied to said tapered plunger against the bias force of said spring to reset triggering of said centering means.

8. A front and rear wheel steering system as claimed in claim 1 wherein said actuator means comprises a short-stroke hydraulic cylinder having a piston rod extending from opposite ends of the cylinder, each piston rod being jointed for connection to respective tie rods for application of steering output forces to said rear wheels, a hydraulic valve providing the control between said differential means and said actuator, said hydraulic valve being integrated with said rear steer controller and coupled to said actuator by two hydraulic lines.

9. A front and rear wheel steering system as claim ed in claim 8 wherein said hydraulic valve comprises one of an open-centre 4-way servo valve and an open-centre 4-way spool valve.

10. A front and rear wheel steering system as claimed in claim 1 wherein said mechanical feedback means comprises at least one flexible rod or wire.

11. A front and rear wheel steering system as claimed in claim 8 or 10 wherein the mechanical feedback means is housed within at least one of said two hydraulic lines.

12. A front and rear wheel steering system as claimed in claim 8 wherein the two hydraulic lines are fitted one within the other and said mechanical feedback means is housed within the innermost of said two hydraulic lines.

13. A front and rear wheel steering system as claimed in claim 2 wherein said front steer system and said rear steer system are hydraulically driven by a single hydraulic pump through a first hydraulic circuit for said rear steer system and a second hydraulic circuit for said front steer system, said first and second hydraulic circuits being connected in series, a by-pass relief valve arranged in parallel with said hydraulic circuit for said rear steer system to facilitate continued supply of hydraulic power to said front steer system when said safety device has operated to lock said rear wheels to a straight ahead condition.

14. A front and rear wheel steering system as claimed in claim 1 comprising warning means activated upon removal of said predetermined functional relationship.

15. A front and rear wheel steering system for a vehicle as claimed in claim 1 wherein the mechanical function generating means comprises first and second function generating means arranged in series with the output of the first means providing the input to the second means, the output of the first or second means being dependent upon said steer position of said front wheels and the output of the second or first means, respectively, being dependent upon vehicle speed, and wherein the front steer position dependent function generating means comprises a pin and slot device having a driving member rotatable about an axis and carrying said pin offset from that axis, said pin engaging a pivoted driven member via a radial slot in said driven member.

16. A front and rear wheel steering system as claimed in claim 15, wherein the driven member comprises an arcuate slot extending either side of the pivotal axis of the driven member, a swinging link having a link pin at one end slidably engaging the arcuate slot, the axis of the swinging link being generally perpendicular to the arcuate slot When the driven member and the swinging link are in their mid-positions, the other end of the swinging link being pivotally connected to an equalising bar arranged generally parallel to said arcuate slot.

17. A front and rear wheel steering system as claimed in claim 16, wherein the swinging link is pivoted such that movement about the pivotal connection with the equalising bar transverse to the longitudinal axis of the swinging link is restrained, the angular position of the swinging link being controllable in accordance with vehicle speed to cause the rear wheels to turn in the same direction as the front wheels when the link pin engages in one side of the arcuate slot relative to the radial axis through the centre of the radial slot and in the opposite direction to the front wheels when the link pin engages in the other side of the arcuate slot.

18. A front and rear wheel steering system as claimed in claim 1, wherein said rear steer controller is directly geared from the input-shaft of said front steer system.

* * * * *